United States Patent
Ye et al.

(10) Patent No.: US 10,541,955 B2
(45) Date of Patent: Jan. 21, 2020

(54) MESSAGE TRANSMITTING METHOD, MESSAGE PROCESSING METHOD AND TERMINAL

(71) Applicant: Tencent Technology (Shenzhen) Company Limited, Shenzhen, Guangdong (CN)

(72) Inventors: Liwei Ye, Shenzhen (CN); Yu Chen, Shenzhen (CN); Bin Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 99 days.

(21) Appl. No.: 15/720,248

(22) Filed: Sep. 29, 2017

(65) Prior Publication Data

US 2018/0054404 A1   Feb. 22, 2018

Related U.S. Application Data

(63) Continuation of application No. PCT/CN2016/078966, filed on Apr. 11, 2016.

(30) Foreign Application Priority Data

May 22, 2015   (CN) .......................... 2015 1 0267949

(51) Int. Cl.
*H04L 12/58* (2006.01)
*H04M 1/725* (2006.01)

(52) U.S. Cl.
CPC .............. *H04L 51/10* (2013.01); *H04L 51/04* (2013.01); *H04M 1/7255* (2013.01); *H04M 1/72555* (2013.01)

(58) Field of Classification Search
CPC .... H04L 51/10; H04L 51/04; H04M 1/72547; H04M 1/7255; H04M 1/72555
(Continued)

(56) References Cited

U.S. PATENT DOCUMENTS 6,252,588 B1 * 6/2001 Dawson .................. G06F 9/451
                                                                 715/752
9,942,393 B2    4/2018 Ushio et al.
(Continued)

FOREIGN PATENT DOCUMENTS

CN        101217684 A       7/2008
CN        102830977 A       12/2012
(Continued)

OTHER PUBLICATIONS

English Translation of the Notification of the First Office Action of Korean application No. 10-2017-7033122, dated Oct. 8, 2018.
(Continued)

*Primary Examiner* — Tu T Nguyen
(74) *Attorney, Agent, or Firm* — Oppedahl Patent Law Firm LLC

(57) ABSTRACT

A message transmitting method. In the method, a receiving party identifier is acquired; a visual element is acquired; a sound gathering instruction is received; a sound is gathered to form audio data according to the sound gathering instruction; and a message is generated according to the visual element and the audio data, and is transmitted to a message receiver corresponding to the receiving party identifier, so as for the message receiver to present the visual element and play the audio data.

20 Claims, 7 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2005/0210394 A1* | 9/2005 | Crandall | H04L 12/1831 715/752 |
| 2008/0235024 A1 | 9/2008 | Goldberg | |
| 2015/0025891 A1 | 1/2015 | Goldberg et al. | |
| 2015/0200881 A1 | 7/2015 | Zheng | |
| 2016/0277903 A1* | 9/2016 | Poosala | H04W 4/12 |
| 2017/0134321 A1 | 5/2017 | Ushio et al. | |
| 2017/0353408 A1 | 12/2017 | Chen | |

FOREIGN PATENT DOCUMENTS

| | | |
|---|---|---|
| CN | 103369477 A | 10/2013 |
| CN | 103457825 A | 12/2013 |
| CN | 104780093 A | 7/2015 |
| CN | 105049318 A | 11/2015 |
| JP | 2002024143 A | 1/2002 |
| JP | 2004072252 A | 3/2004 |
| JP | 2005242613 A | 9/2005 |
| JP | 2006033017 A | 2/2006 |
| JP | 2006092052 A | 4/2006 |
| JP | 2004362419 A | 12/2014 |
| JP | 2016005131 A | 1/2016 |
| JP | 2016014976 A | 1/2016 |
| JP | 2016038615 A | 3/2016 |
| KR | 20100093750 A | 8/2010 |
| KR | 101363866 B1 | 2/2014 |

OTHER PUBLICATIONS

International Search Report in international application No. PCT/CN2016/078966, dated May 27, 2016.
English Translation of the Written Opinion of the International Search Authority in international application No. PCT/CN2016/078966, dated May 27, 2016.
Notification of the First Office Action of Chinese application No. 201510267949.2, dated Oct. 10, 2017.
English translation of the Notification of the First Office Action of Chinese application No. 201510267949.2, dated Oct. 10, 2017.
English Translation of the Notification of the First Office Action of Japanese application No. 201510267949.2, dated Jul. 10, 2018.
English Translation of the Notification of the Second Office Action of Chinese application No. 201510267949.2, dated Aug. 2, 2018.

* cited by examiner

MESSAGE TRANSMITTING METHOD, MESSAGE PROCESSING METHOD AND TERMINAL

CROSS-REFERENCE TO RELATED APPLICATIONS

This is a continuation application of International Patent Application No. PCT/CN2016/078966, filed on Apr. 11, 2016, which claims priority to Chinese Patent Application No. 201510267949.2 filed on May 22, 2015, the disclosure of which is incorporated by reference herein in its entirety.

BACKGROUND

Emergency and development of the instant messaging technology bring convenience for communication between people. At present, an instant messaging application may not only transmit text information in real time but also transmit a picture or an animation file, for example, a static or dynamic expression, and what a user tries to express may be simply transmitted through the static or dynamic expression. For example, if a first user transmits an expression picture of laughing to a second user, the second user may know that the first user is in good mood; and on the contrary, if the first user transmits an expression picture of crying to the second user, the second user may know that the first user is in bad mood.

However, because of complexity of emotions of people, a single expression picture or expression animation may be applicable to a limited number of scenarios when transmitting information, an amount of the information which may be transmitted is very limited, there are limitations in terms of information transmission, information transmission efficiency is not high, and thus improvement is required.

SUMMARY

The disclosure relates to the technical field of communications, and more particularly to a message transmitting method, a message processing method and a terminal.

According to various embodiments provided by the disclosure, a message transmitting method, a message processing method and a terminal are provided.

A message transmitting method, performed at a terminal having one or more processors and memory, the method may include that: a receiving party identifier of a receiving party is acquired, wherein the receiving party identifier is configured to identify the receiving party; a visual element is acquired; in response to a sound gathering instruction, a sound is gathered; audio data configured for combining the visual element is formed in accordance with the sound gathering instruction; and a message is generated by combining the visual element and the audio data for a transmission of the message, wherein the message is configured to present the visual element while playing the audio data.

A terminal may include a memory and a processor, an executable instruction being stored in the memory, wherein the executable instruction may be executed by the processor to cause the processor to execute the following steps that: a receiving party identifier of a receiving party is acquired, wherein the receiving party identifier is configured to identify the receiving party; a visual element is acquired; in response to a sound gathering instruction, a sound is gathered; audio data configured for combining the visual element is formed in accordance with the sound gathering instruction; and a message is generated by combining the visual element and the audio data for a transmission of the message, wherein the message is configured to present the visual element while playing the audio data.

A message transmission system may include a first terminal and a second terminal communicatively coupled to the first terminal. The first terminal is configured to acquire a receiving party identifier of a receiving party, wherein the receiving party identifier is configured to identify the receiving party; acquire a visual element; in response to a sound gathering instruction, gathering a sound; form audio data, configured for combining the visual element, in accordance with the sound; and generate a message by combining the visual element and the audio data for a transmission of the message, wherein the message is configured to present the visual element while playing the audio data. The second terminal is configured to receive the message parse the message to obtain the visual element and the audio data, and present the visual element while playing the audio data.

BRIEF DESCRIPTION OF THE DRAWINGS

In order to describe the technical solutions of embodiments of the disclosure or the related art more clearly, the drawings required to be used for descriptions about the embodiments or the conventional art will be simply introduced. Obviously, the drawings described below are only some embodiments of the disclosure, and those skilled in the art may also obtain other drawings according to these drawings on the premise of no creative work.

DETAILED DESCRIPTION

In order to make the purpose, technical solutions and advantages of the disclosure clearer, the disclosure will be further described below with reference to the drawings and embodiments in detail. It should be understood that the specific embodiments described here are provided to explain the disclosure and not intended to limit the disclosure.

Figure 1:
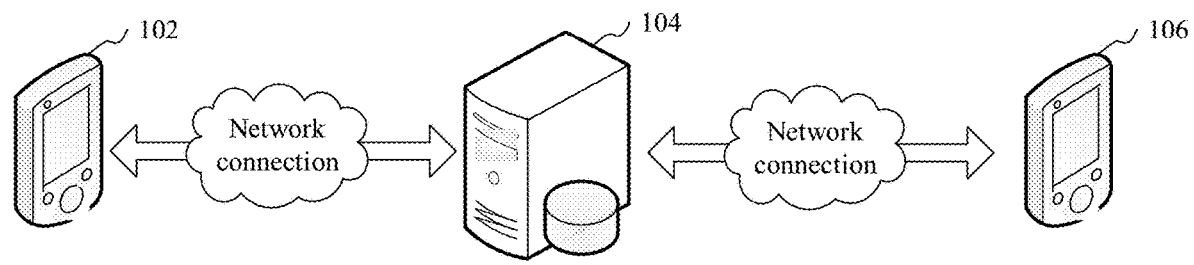
FIG. 1 is a diagram of an application environment of a message transmission system according to an embodiment.

As shown in FIG. 1, in an embodiment, a message transmission system 100 is provided, which includes a message transmitter 102, a server 104 and a message receiver 106. The message transmitter 102 is a terminal configured to transmit a message, and the message receiver 106 is a terminal configured to receive the message. In order to implement two-way communication, functions of the terminal serving as the message transmitter 102 and the terminal serving as the message receiver 106 may be exchanged.

In an embodiment, a structure of the message transmitter 102 is shown in FIG. 202, which includes a processor, internal memory, a non-volatile storage medium, a network interface, a sound gathering device, display screen, a loudspeaker and an input device which are connected through a system bus. A message transmitting device is stored in the non-volatile storage medium of the message transmitter 102, and the message transmitting device is configured to implement a message transmitting method. The processor of the message transmitter 102 provides calculation and control capabilities, and is configured to execute the message transmitting method. The display screen of the message transmitter 102 may be a liquid crystal display screen, an electronic ink display screen or the like, and the input device of the message transmitter 102 may be a touch layer which overlays the display screen, may also be a key, trackball or touchpad arranged on a housing of the message transmitter 102, and may further be an external keyboard, touchpad, mouse or the like. The message transmitter 102 may be a mobile phone, a tablet computer or a personal digital computer.

Figure 3:
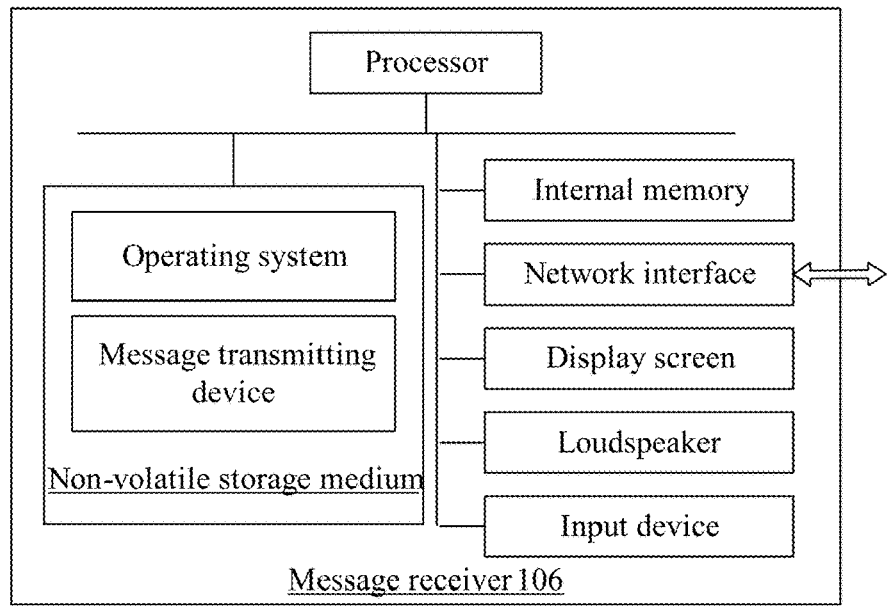
FIG. 3 is a structure diagram of a message receiver according to an embodiment.

In an embodiment, a structure of the message receiver 106 is shown in FIG. 3, and includes a processor, internal memory, a non-volatile storage medium, a network interface, display screen, a loudspeaker and an input device which are connected through a system bus. A message processing device is stored in the non-volatile storage medium of the message receiver 106, and the message processing device is configured to implement a message processing method. The processor of the message receiver 106 provides calculation and control capabilities, and is configured to execute the message processing method. The display screen of the message receiver 106 may be a liquid crystal display screen, an electronic ink display screen or the like, and the input device of the message receiver 106 may be a touch layer which covers the display screen, or may be a key, trackball or touchpad arranged on a housing of the message receiver 106, or may be an external keyboard, touchpad, mouse or the like. The message receiver 106 may be a mobile phone, a tablet computer or a personal digital computer. The message receiver 106 may be a terminal of the same type with the message transmitter 102, and may also be a terminal of a different type.

Figure 2:
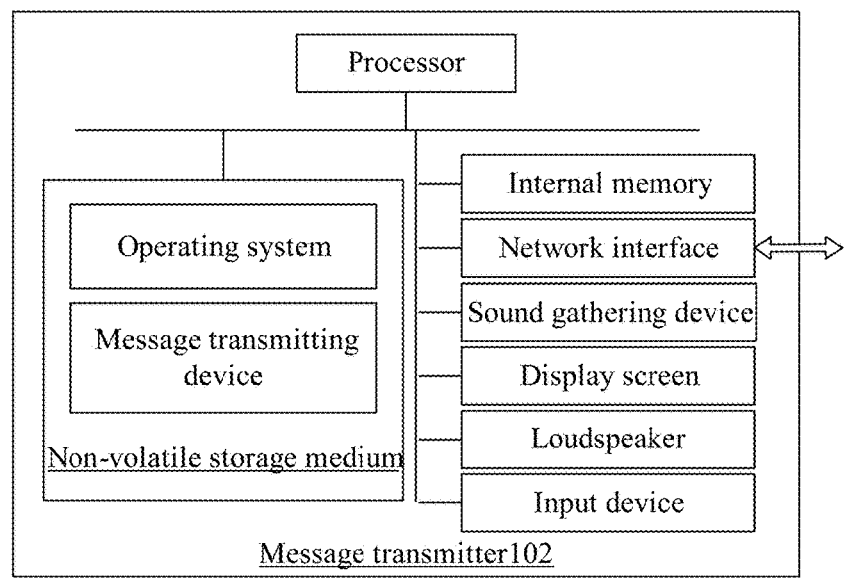
FIG. 2 is a structure diagram of a message transmitter according to an embodiment.
Figure 4:
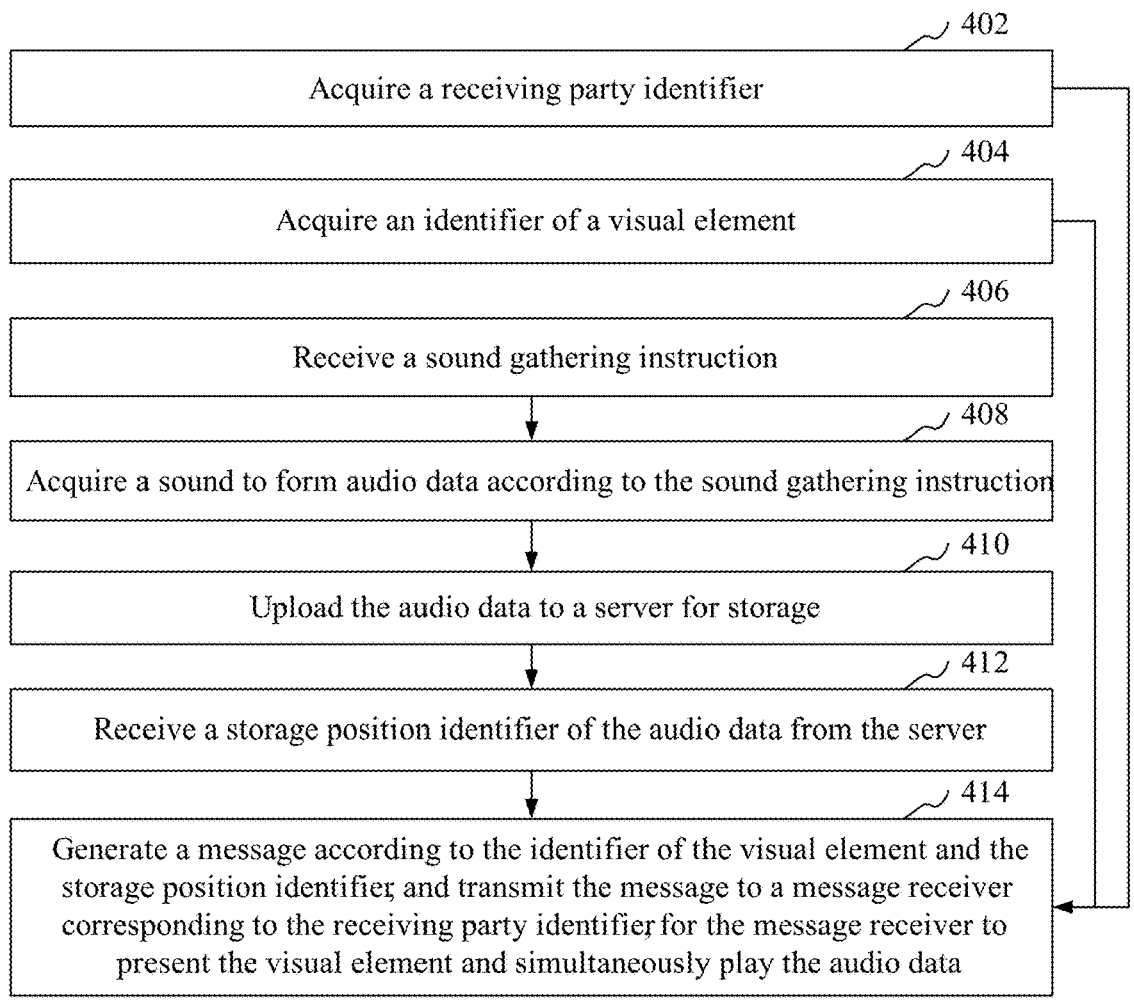
FIG. 4 is a flowchart of a message transmitting method according to an embodiment.

As shown in FIG. 4, in an embodiment, a message transmitting method is provided. Description will be made with application of the method to a message transmitter 102 in FIG. 1 and FIG. 2 as an example in the embodiment. The message transmitter 102 runs an application program, and the message transmitting method is implemented through the application program. The method specifically includes the following steps.

In Step 402, a receiving party identifier is acquired.

Specifically, the receiving party identifier is a unique identifier of a specified user required to receive a message. The receiving party identifier may be a character string including at least one of the following types of characters, i.e., number, letter of punctuation mark. Step 402 is only required to be executed before Step 414, and may be executed before or after any of Step 404~Step 412.

In an embodiment, after a friend list presenting instruction is received, a friend list corresponding to a user identifier currently used for login may be acquired and presented, and after a selection instruction for a user identifier in the friend list is received, the selected user identifier is determined as the receiving party identifier according to the selection instruction.

Figure 5:
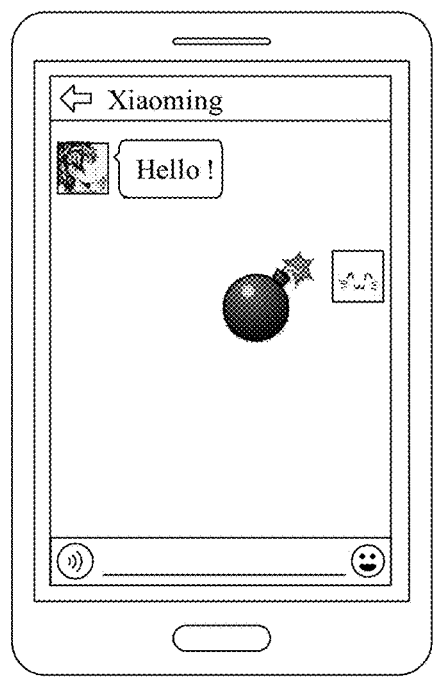
FIG. 5 is a schematic diagram of a communication dialogue page on a message transmitter according to an embodiment.

In an embodiment, if a current page is a communication dialogue page, a user identifier of a communication object corresponding to the current communication dialogue page may be directly acquired as the receiving party identifier. For example, the current page is a communication dialogue page shown in FIG. 5, a user nickname of the communication object is "Xiaoming", the communication object has a unique user identifier, and the user identifier may be directly acquired as the receiving party identifier.

In Step 404, an identifier of a visual element is acquired.

Step 404 is only required to be executed before Step 414. The visual element refers to data which may be displayed for eyes to see, so as to transmit some information. The visual element includes, but not limited to, a picture or an animation file. Here, the picture may be in a Joint Photographic Experts Group (JPEG) format (a picture format, i.e. an image compression standard set by the JPEG), a Portable Network Graphic (PNG) format or another self-defined picture format; and the animation file may be in a Graphics Interchange Format (GIF), a Shock Wave Flash (SWF) format (a FLASH animation file format provided by the Adobe company) or another self-defined animation file format.

The picture may specifically be an expression picture, and the animation file may specifically be an expression animation file. The expression picture may be, for example, a face picture which expresses a human emotion such as joy, anger, sorrow and happiness, or may be a picture which expresses an activity related to people such as food, clothing, shelter and means of traveling. The identifier of the visual element is configured to uniquely identify the visual element. For example, a corresponding relationship between a visual element and a corresponding identifier may be set to be shown in Table 1:

TABLE 1

| Visual element | Animation name | Identifier (or called type) |
|---|---|---|
| Throw a bomb | Animate_bomb | 1 |
| Poke | Animate_poke | 2 |
| Kiss | Animate_kiss | 3 |

Here, the visual element may be a specific visual element selected from a visual element set. Specifically, a visual element list presenting triggering control may be presented in the current communication dialogue page; a visual element list is triggered to be presented when an operation over the visual element list present triggering control is detected; and after a visual element selection instruction for the visual element list is received, an identifier of a selected visual element is determined as the identifier of the visual element according to the selection instruction.

In Step 406, a sound gathering instruction is received.

Specifically, the sound gathering instruction may be automatically triggered after the identifier of the visual element is acquired, so that operating steps may be reduced, and convenience for operation may be improved. A sound gathering triggering control may also be presented at the same time of presenting the visual element list, and when an operation over the sound gathering triggering control is detected, the sound gathering instruction is triggered. A movement trajectory of the device may further be detected through a movement sensor, and when the detected movement trajectory is matched with a preset movement trajectory, the sound gathering instruction is triggered. For example, the user may trigger the sound gathering instruction by shaking a mobile phone.

In Step 408, a sound is gathered to form audio data according to the sound gathering instruction.

Specifically, after the sound gathering instruction is received, a sound gathering device such as a microphone is called to acquire an environmental sound. The user may speak or produce a sound by virtue of another sound producer, and then the sound gathering device acquires a voice of the user or the other produced sound, and performs compression coding to form the audio data in a preset audio coding manner.

In an embodiment, a sampling state for sound gathering adopts an 8 kHZ single-channel manner, so that a problem about compatibility of different operating systems is solved, and meanwhile, a volume of the audio data is further compressed to save traffic and transmission time while ensuring intelligibility of a voice of an audio file.

In an embodiment, Step 408 specifically includes that: sound gathering is started in response to the sound gathering instruction, and sound gathering is stopped upon detection of a stop-gathering instruction, to obtain the audio data. Specifically, sounds in an environment within a time period from a moment when the sound gathering instruction is detected to a moment when the stop-gathering instruction is detected are acquired through the sound gathering device, and form audio data by audio compression coding.

Furthermore, the user may touch a position, where the sound gathering triggering control is presented, on a touch display screen of the device to trigger the sound gathering instruction, and the user keeps pressing the sound gathering triggering control, and triggers the stop-gathering instruction when cancelling pressure on the sound gathering triggering control. Or, the user may touch once the position, where the sound gathering triggering control is presented, on the touch display screen of the device to trigger the sound gathering instruction, and touch it again to trigger the stop-gathering instruction.

In an embodiment, Step 408 specifically includes that: sound gathering and timing is started in response to the sound gathering instruction, and sound gathering is stopped to obtain the audio data when the timing reaches a preset time length. In the embodiment, the user is only required to trigger the sound gathering instruction, the timing is started when the sound gathering instruction is detected, and gathering is stopped after audio data of the preset time length is gathered, so that control over the volume of the audio data is facilitated, and excessive consumption of network resources is prevented. Here, the preset time length may be 5 seconds to 1 minute, and is preferably 10 seconds to 25 seconds.

In an embodiment, the specific steps of Step 408 in the above two embodiments may be combined, and Step 408 specifically includes that: sound gathering and timing are started in response to the sound gathering instruction, and if the stop-gathering instruction is detected when the timing does not reach the preset time length, sound gathering is stopped to obtain the audio data; and when the timing reaches the preset time length, sound gathering is stopped to obtain the audio data.

In Step 410, the audio data is uploaded to a server for storage.

Specifically, the acquired audio data is automatically grouped and uploaded to the server 104 at the same time when the sound is acquired, so that the server 104 stores and generates a storage position identifier after receiving the complete audio data. The audio data may also be automatically uploaded to the server 104 for storage and generation of the corresponding storage position identifier after the audio data is formed.

The storage position identifier may be a complete storage address according to which the corresponding audio data on the server 104 is positioned, and may also be an identification number of the audio data. A message receiver 106 may pre-store default addresses of each piece of audio data stored in the server 104, and may position the audio data stored in the server 104 by combining the default address and the identification number of the audio data.

In Step 412, a storage position identifier of the audio data is received from the server.

The server 104, after successfully storing the audio data, may feed back the corresponding storage position identifier to the message transmitter 102 which uploads the audio data for the message transmitter 102 to receive.

In Step 414, a message is generated according to the identifier of the visual element and the storage position identifier, and is transmitted to a message receiver corresponding to the receiving party identifier, so as for the message receiver to present the visual element and simultaneously play the audio data.

Specifically, the message may be generated according to a preset message structure by using the identifier of the visual element and the storage position identifier. Here, the preset message structure may be in a JavaScript Object Notation (JSON) format (a lightweight data interchange format), an Extensible Markup Language (XML) format or another custom message format.

In an embodiment, the message may also be generated according to the receiving party identifier, a message time, the identifier of the visual element and the storage position identifier. The message time refers to a message generation time. The message receiver 106 may present the message time when presenting the corresponding message, and the message time may also be used to sequence and present the received messages. In a specific embodiment, a specific structure of the generated message is shown in Table 2:

TABLE 2

| Attribute meaning | Attribute name | Attribute value data type |
|---|---|---|
| Receiving party identifier | uuid | Long (long integer type) |
| Message time | msg_time | Float (float type) |
| Animation type | animate_type | Int (integer type) |
| Audio data access address | voice-url | String (character type) |

The message transmitter 102 may establish a point-to-point connection with the message receiver 106 corresponding to the receiving party identifier, thereby directly transmitting the message to the message receiver 106 through the point-to-point connection. The transmitted message may be used to trigger presenting of the visual element on the message receiver 106 and simultaneous playing of the audio data downloaded from the server according to the storage position identifier.

According to the message transmitting method, the user may autonomously record and upload the audio data to the server for storage, at the same time of selecting the visual element. After the message generated according to the identifier of the visual element and the storage position identifier of the audio data in the server is transmitted to the message receiver, the message receiver may present the visual element and simultaneously play the audio data acquired from the server according to the storage position identifier. Therefore, the message transmitted once by the user may not only deliver information expressed by the visual element but also deliver information delivered through the audio data, an amount of information which may be delivered through one message transmission is increased, and users may communicate more conveniently.

In an embodiment, Step 414 specifically includes that: the message is generated according to the identifier of the visual element, the receiving party identifier and the storage position identifier, and is transmitted to the server, so as for the server to acquire the receiving party identifier from the message and transmit it to the corresponding message receiver.

Specifically, the message receiver 106 logs in the server 104 according to the receiving party identifier, and establishes and maintains a long connection with the server 104, so that the server 104 may directly communicate with the message receiver 106 through the long connection as desired. After the message transmitter 102 transmits the message to the server 104, the server 104 parses out the receiving party identifier from the message, thereby transmitting the message to the message receiver 106 corresponding to the receiving party identifier through the long connection corresponding to the receiving party identifier.

In an embodiment, the server 104 may also detect a login state corresponding to the receiving party identifier, and if it is an unlogged-in state, caches the message, and transmits the cached message to the message receiver 106 corresponding to the receiving party identifier when the receiving party identifier corresponds to a logged-in state; and if the login state is the logged-in state, the message is directly transmitted to the message receiver 106 corresponding to the receiving party identifier.

In the embodiment, the message transmitter 102 and the message receiver 106 deliver messages through the server 104, and message deliver efficiency and quality may be ensured.

In an embodiment, before or after Step 414, the method further includes that: the visual element is presented, and the audio data formed by locally gathering the sound is simultaneously played. In the embodiment, the visual element is locally automatically presented, and the corresponding audio data is played, so that the user may immediately know an effect which may be achieved by the transmitted message, and may cancel transmission of the message as desired, and convenience in operation is improved.

The principle of the message transmitting method will be described below with connection to a specific application scenario, which is described with the condition that the message transmitter is a first mobile phone and the message receiver is a second mobile phone as an example. The following steps are specifically included.

Figure 6:
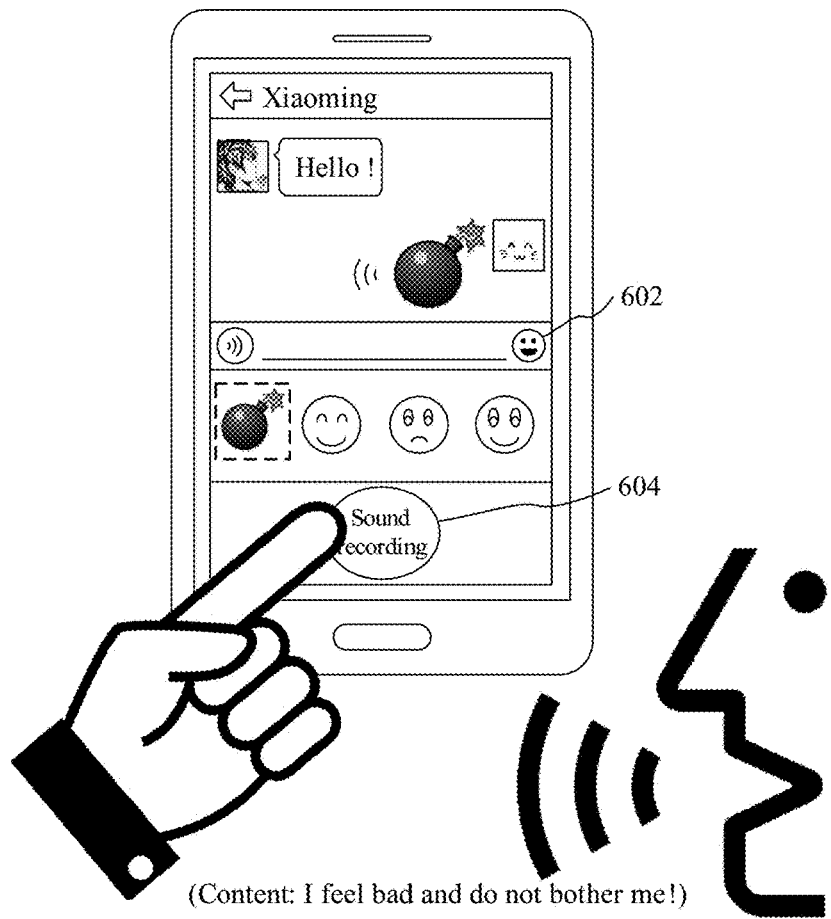
FIG. 6 is a schematic diagram of an interface for implementing a message transmitting method on a first mobile phone in a specific application scenario.

Referring to FIG. 6, a first user operates the first mobile phone running an instant messaging application, and enters a communication dialogue page, and the first user clicks an expression animation selection key 602, and selects an animation of throwing a bomb in a presented expression animation list as a specified expression animation. Then, the first user presses a sound recording key 604, and starts saying "I feel bad and do not bother me !", and then releases the sound recording key 602 from a finger; in such a manner, the first mobile phone acquires words said by the user in a time period from pressing the sound recording key 602 to releasing to form voice data. The first mobile phone uploads the voice data to a server for storage, and receives a storage address of the voice data from the server. The first mobile phone generates a message according to a message structure shown in Table 2, and transmits it to the server, and the server parses out a receiving party identifier from the message, and transmits it to the corresponding second mobile phone.

Figure 7:
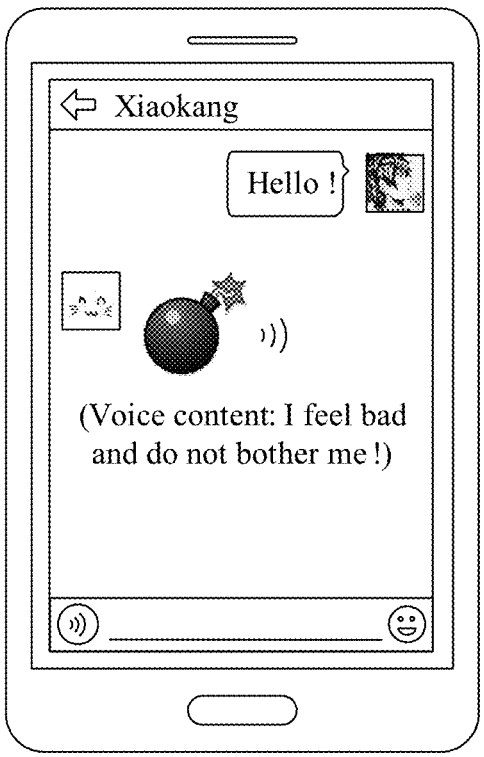
FIG. 7 is a schematic diagram of an interface for presenting a specified expression animation and playing corresponding voice data on a second mobile phone in a specific application scenario.

Referring to FIG. 7, a second user operates the second mobile phone running an instant messaging application, and enters a communication dialogue page. After receiving the message transmitted by the first mobile phone, the second mobile phone parses the message to obtain an identifier of the animation of throwing a bomb and the storage address of the voice data stored in the server. The second mobile phone downloads the corresponding voice data from the server according to the storage address, then presents the animation of throwing a bomb in the communication dialogue page, and simultaneously plays the downloaded voice data. In such a manner, the second user may see the expression animation of throwing a bomb transmitted by the first user, and may also hear the appended voice content "I feel bad and do not bother me !", and the second user will know a meaning of the expression animation of throwing a bomb transmitted by the first user without misunderstanding.

Figure 8:
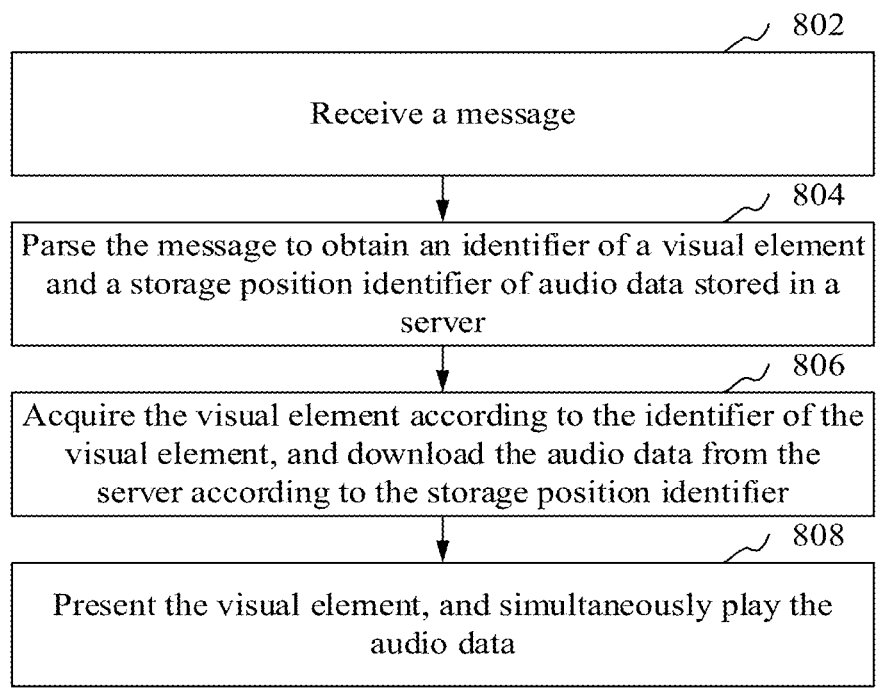
FIG. 8 is a flowchart of a message processing method according to an embodiment.

As shown in FIG. 8, in an embodiment, a message processing method is provided. Description are made with application of the method to a message receiver 106 shown in FIG. 1 and FIG. 3 as an example in the embodiment. The method is executed by the message receiver 106 after a message transmitter 102 executes Step 414 in the message transmitting method. The message receiver 106 runs an application program, and the message processing method is implemented through the application program. The method specifically includes the following steps.

In Step 802, a message is received.

Specifically, the message transmitter 102 may establish a point-to-point connection with the message receiver 106 corresponding to a receiving party identifier, thereby directly transmitting the message to the message receiver 106 through the point-to-point connection. The message receiver 106 may receive the message transmitted by the message transmitter 102 through the point-to-point connection.

The message transmitter 102 may generate the message according to an identifier of a visual element, the receiving party identifier and a storage position identifier and transmit it to a server 104, then the server 104 may acquire the receiving party identifier from the message and transmit it to the corresponding message receiver 106, and correspondingly, the message receiver 106 may receive the message transmitted by the server 104.

In Step 804, the message is parsed to obtain an identifier of a visual element and a storage position identifier of audio data stored in a server.

Specifically, according to a preset message structure, the message transmitter 102 may generate the message using the identifier of the visual element and the storage position identifier. Correspondingly, the message receiver 106 parses the message according to the preset message structure, and acquires the identifier of the visual element and the storage position identifier of the audio data stored in the server, where the preset message structure may be a JSON format, an XML format or another self-defined message format. The audio data stored in the server is acquired and uploaded to the server by the message transmitter 102.

In Step 806, the visual element is acquired according to the identifier of the visual element, and the audio data is downloaded from the server according to the storage position identifier.

Specifically, the message receiver 106 may locally query a visual element according to the identifier of the corresponding visual element. If the visual element is not found, the message receiver 106 may initiate an acquisition request carrying the identifier of the visual element to the server 104 and receive the visual element which is queried and fed back by the server 104 according to the acquisition request and corresponds to the identifier of the visual element.

The storage position identifier may be a complete storage address according to which the corresponding audio data on the server 104 is positioned, so that the message receiver 106 may directly request to download the corresponding audio data from the server 104 according to the complete storage address. The storage position identification may also be an identification number of the audio data, so that the message receiver 106 may acquire pre-stored default addresses of each piece of audio data stored in the server 104, and obtain the complete storage address of the audio data by combining the default address and the identification number of the audio data, and the message receiver 106 may further request to download the corresponding audio data from the server 104 according to the complete storage address.

In Step 808, the visual element is presented, and the audio data is simultaneously played.

The visual element may be a picture or an animation file, and the message receiver 106 may present the visual element in a current communication dialogue page and simultaneously decode and play the audio data through a local loudspeaker. If being an animation file, the visual element may be cyclically played and presented, or may be stopped after being cyclically played and presented for a preset number of times. A user may not only view the visual element transmitted by the message transmitter 102 but also hear a content of the appended audio data.

In an embodiment, a sampling rate for playing the audio data adopts an 8 kHZ single-channel manner, so that a problem about compatibility of different operating systems is solved, and meanwhile, a volume of the audio data is further compressed to save traffic and transmission time while ensuring intelligibility of a voice of an audio file.

According to the message processing method, the message is generated according to the identifier of the visual element and the storage position identifier of the audio data stored in the server. In such a manner, after the message delivered once is received, the visual element may be acquired, the corresponding audio data may be downloaded, and the audio data may be simultaneously played when the visual element is presented. Therefore, the message received once by the user may not only deliver information expressed by the visual element but also deliver information delivered through the audio data, an amount of information which may be delivered by one message transmission is increased, and users may communicate more conveniently.

Figure 9:
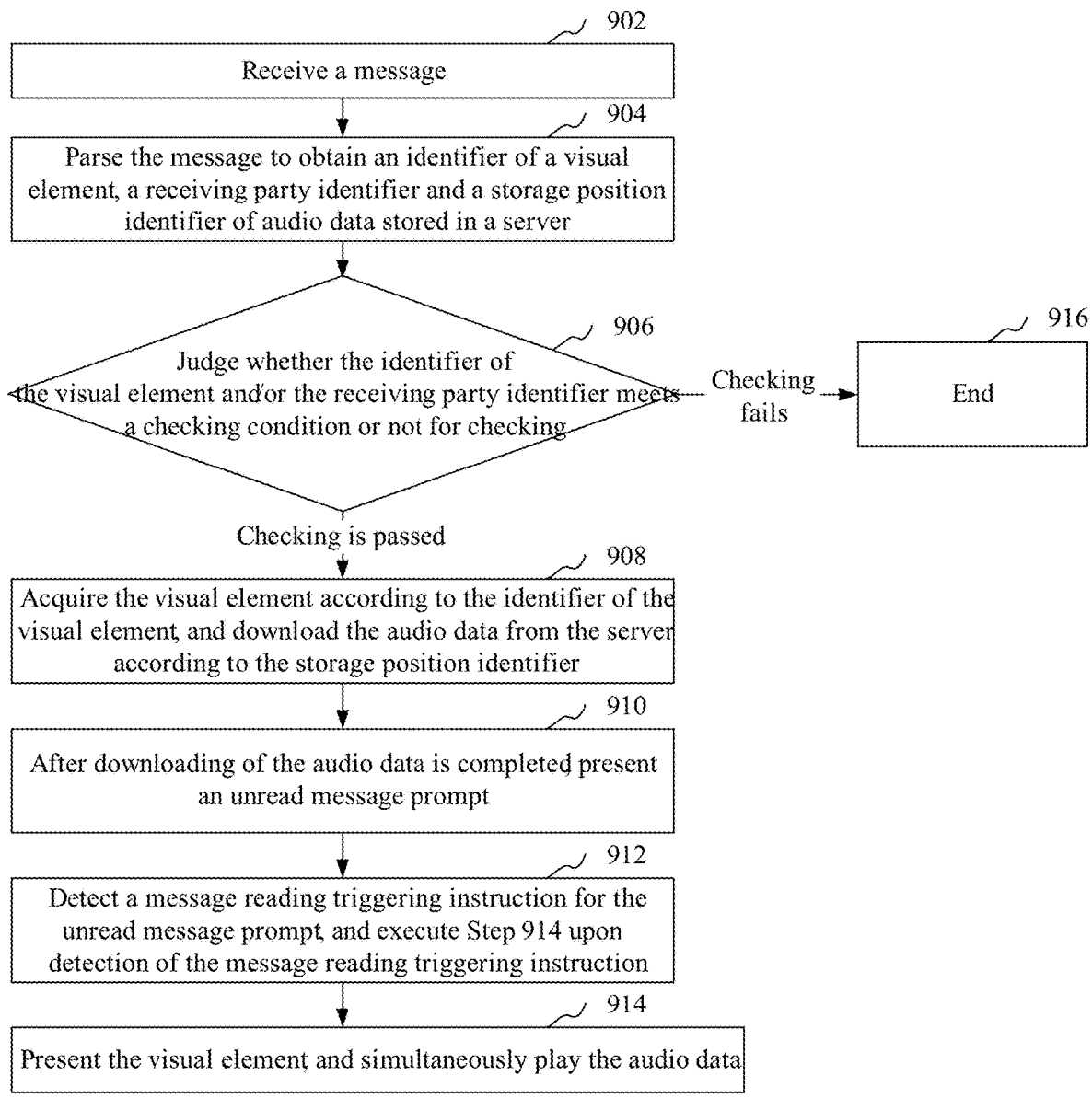
FIG. 9 is a flowchart of a message processing method according to another embodiment.

As shown in FIG. 9, in another embodiment, a message processing method is provided, which specifically includes the following steps.

In Step 902, a message is received.

Specifically, a message receiver 106 may receive the message transmitted by a message transmitter 102 through a point-to-point connection, or may receive the message forwarded by a server 104 according to a receiving party identifier after acquiring the receiving party identifier from the message transmitted by the message transmitter 102.

In Step 904, the message is parsed to obtain an identifier of a visual element, a receiving party identifier and a storage position identifier of audio data stored in a server.

Specifically, according to a preset message structure, the message transmitter 102 may generate the message using the identifier of the visual element and the storage position identifier. Correspondingly, the message receiver 106 parses the message according to the preset message structure, and acquires the identifier of the visual element and the storage position identifier of the audio data stored in the server. The preset message structure may be in a JSON format, an XML format or another self-defined message format. The audio data stored in the server is acquired and uploaded to the server by the message transmitter 102.

In an embodiment, a message time may also be parsed out of the message. The message receiver 106 may present the message time when presenting the corresponding message. The message time may also be used to sequence and present the received messages.

In Step 906, it is judged whether the identifier of the visual element and/or the receiving party identifier meets a checking condition or not for checking. Step 908 is executed if checking is passed, and Step 916 is executed if checking fails.

Here, checking is data consistency checking, and the checking condition is a data consistency checking condition. The checking condition includes that: the identifier of the visual element is within a visual element identifier set supported by a current application configured to present the visual element; and/or, the receiving party identifier is matched with a current login user identifier.

The supported visual element identifier set refers to that the current application configured to present the visual element may support visual elements corresponding to any identifier in the visual element identifier set. The identifier of the visual element being within the supported visual element identifier set indicates that the visual element may be applicable to the application. Checking whether the identifier of the visual element is within the supported visual element identifier set or not may ensure that the current application may support presenting of the visual element.

The current login user identifier refers to a user identifier used by a user for login for communication. Matching of the receiving party identifier and the current login user identifier may be complete consistency of the receiving party identifier and the user identifier, or may be association of the receiving party identifier and the user identifier. Checking whether the receiving party identifier is matched with the current login user identifier or not may ensure that the message received by the message receiver 106 is indeed intended to be transmitted to the message receiver 106 and thus avoid an error.

In Step 908, the visual element is acquired according to the identifier of the visual element, and the audio data is downloaded from the server according to the storage position identifier.

Specifically, the message receiver 106 may locally query a visual element according to the identifier of the corresponding visual element, and if the visual element is not found, the message receiver 106 may initiate an acquisition request carrying the identifier of the visual element to the server 104 and receive the visual element which is queried and fed back by the server 104 according to the acquisition request and corresponds to the identifier of the visual element.

The storage position identifier may be a complete storage address according to which the corresponding audio data on the server 104 is positioned, so that the message receiver 106 may directly request to download the corresponding audio data from the server 104 according to the complete storage address. The storage position identification may also be an identification number of the audio data, so that the message receiver 106 may acquire the pre-stored default addresses of each piece of audio data stored in the server 104, and obtain the complete storage address of the audio data by combining the default address and the identification number of the audio data, and the message receiver 106 may further request to download the corresponding audio data from the server 104 according to the complete storage address.

In Step 910, after downloading of the audio data is completed, an unread message prompt is presented.

The unread message prompt refers to a prompt configured to indicate that there is a message which has yet not been locally presented, may be a prompt in a text form, for example, "you have an unread message" may be prompted in a system notification bar, or may be a prompt in a graphic form, for example, a graphic in a preset shape, which may specifically be a round dot, may be presented at a preset position on a portrait of the user. Existence of the unread message is prompted to the user only after successful downloading, so that the problem of playing without sound caused by a downloading failure may be avoided.

In Step 912, a message reading triggering instruction for the unread message prompt is detected, and Step 914 is executed when the message reading triggering instruction is detected.

Specifically, the user may click the unread message prompt, thereby triggering the corresponding message reading triggering instruction. The user may also click a preset link or button of "view the unread message" to trigger the message reading triggering instruction. Step 914 is triggered when the message reading triggering instruction is detected. If no instruction is detected, detection is continued until the message reading triggering instruction is detected, and then Step 914 is executed. In Step 914, the visual element is presented, and the audio data is simultaneously played.

The visual element may be a picture or an animation file, and the message receiver 106 may present the visual element in a current communication dialogue page and simultaneously decode and play the audio data through a local loudspeaker. The user may not only view the visual element transmitted by the message transmitter 102 but also hear a content of the appended audio data.

Step 916: the flow is ended.

Specifically, if checking fails, it is indicated that the currently received message is wrong, and is not required to be displayed, and the flow may be directly ended, or the flow may be ended after a prompt indicating a message receiving error is displayed.

In the embodiment, data consistency checking may ensure that the current application supports presenting of the visual element and the message is indeed intended to be transmitted to the message receiver, and may avoid the message receiving error. Moreover, the unread message prompt is presented after downloading of the audio data is completed, and only after the message reading triggering instruction for the unread message prompt is detected, the visual element is presented and the corresponding audio data is played, so that disturbance to a current operation of the user may be avoided, and meanwhile, it is ensured that the information born by the message may be accurately transmitted.

In an embodiment, Step 910 specifically includes that: after downloading of the audio data is completed, it is judged whether a current page is a preset message present page or not, if YES, Step 914 is executed; if NO, the unread message prompt is presented at a preset position of the current page for triggering presenting of the preset message present message.

Specifically, the current page refers to a page currently presented by the message receiver 106, and if the page is the preset message present page, such as a communication dialogue page or a friend detail page, the visual element may be directly presented and the corresponding audio data may be played. If it is not the preset message present page, it is indicated that the user currently may not read the message, and the unread message prompt may be presented at the preset position of the current page for triggering presenting of the preset message present page. Therefore, not only may the user be prompted that there is currently an unread message to avoid disturbance to the current operation of the user and simultaneously ensure that the information born by the message may be accurately transmitted, but also a portal to the preset message present page may be prompted to the user to indicate the user to enter the corresponding page to view the related content.

In an embodiment, if the preset message present page cannot be directly entered from the current page, the unread message prompt may be presented at preset positions, for triggering presenting of a subordinate page, of the current page and each page for transition to the preset message present page. The unread message prompt is preferably a prompt in the graphic form.

In an embodiment, the message processing method further includes that: if the storage position identifier is not acquired by parsing the message, default audio data corresponding to the identifier of the visual element is acquired, the visual element is presented, and the default audio data is simultaneously played.

Specifically, an attribute value corresponding to a storage position identifier attribute in the message may be null, and then the storage position identifier may not be acquired by parsing the message. Acquiring no storage position identifier indicates that the message transmitter 102 does not record any audio data, and at this moment, the default audio data may be directly acquired, the visual element is presented, and the default audio data is simultaneously played. For example, a sound expressed by default audio data of an expression animation of throwing a bomb is a bomb explosion sound, and if a user does not record any audio data, the expression animation of throwing a bomb is presented, and the bomb explosion sound is simultaneously played.

Figure 10:
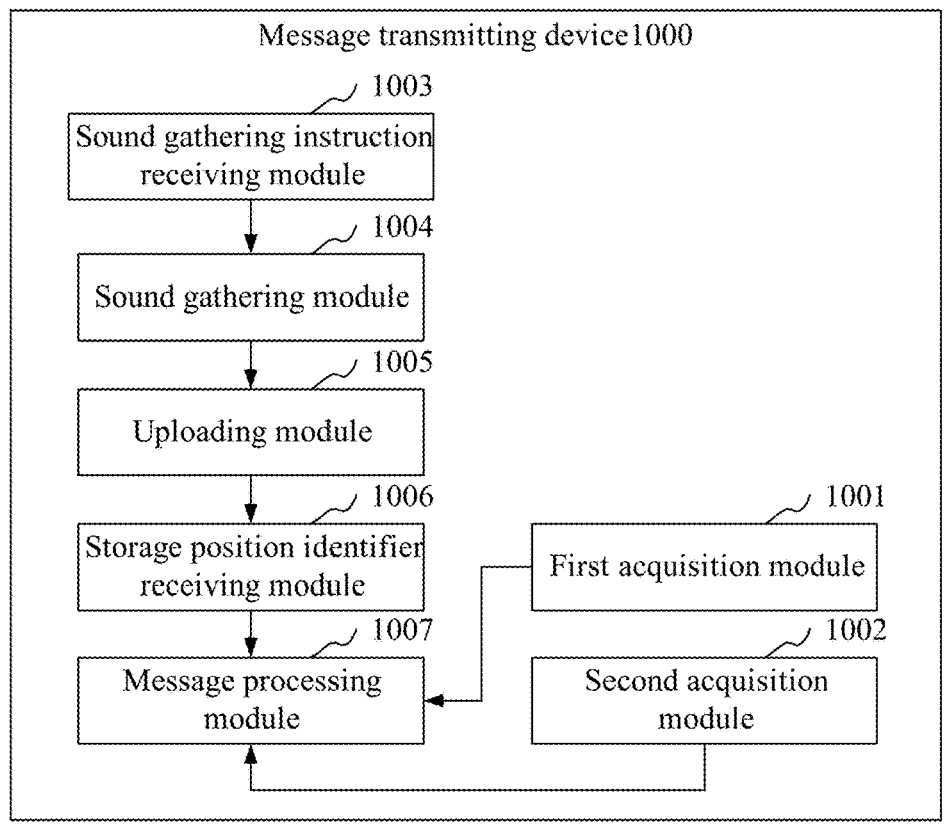
FIG. 10 is a structure block diagram of a message transmitting device according to an embodiment.

As shown in FIG. 10, in an embodiment, a message transmitting device 1000 is provided, which has a function of implementing the message transmitting method of each of the abovementioned embodiments. The message transmitting device 1000 includes a first acquisition module 1001, a second acquisition module 1002, a sound gathering instruction receiving module 1003, a sound gathering module 1004, an uploading module 1005, a storage position identifier receiving module 1006 and a message processing module 1007.

The first acquisition module 1001 is configured to acquire a receiving party identifier.

Specifically, the receiving party identifier is a unique identifier of a specified user that is to receive a message. The receiving party identifier may be a character string including at least one of the following types of characters, i.e., number, letter of punctuation mark. The first acquisition module 1001 may be configured to acquire the receiving party identifier at any moment before the message processing module 1007 generates the message according to an identifier of a visual element and a storage position identifier.

In an embodiment, the first acquisition module 1001 may be configured to, after a friend list present instruction is received, acquire and present a friend list corresponding to a user identifier currently used for login, and after a selection instruction for a user identifier in the friend list is received, determine the selected user identifier as the receiving party identifier according to the selection instruction.

In an embodiment, if a current page is a communication dialogue page, the first acquisition module 1001 may be configured to directly acquire a user identifier of a communication object corresponding to the current communication dialogue page as the receiving party identifier. For example, the current page is a communication dialogue page shown in FIG. 5, a user nickname of the communication object is "Xiaoming", the communication object has a unique user identifier, and the user identifier may be directly acquired as the receiving party identifier.

The second acquisition module 1002 is configured to acquire an identifier of a visual element.

Specifically, the visual element refers to data which may be presented for eyes to see and configured to transmit some information. The visual element includes, but not limited to, a picture or an animation file, wherein a format of the picture may adopt a JPEG format, a PNG format or another self-defined picture format. The animation file may adopt a GIF, an SWF format or another self-defined animation file format.

The picture may specifically be an expression picture, and the animation file may specifically be an expression animation file. The expression picture may be, for example, a face picture which expresses a human emotion such as joy, anger, sorrow and happiness, and may also be a picture which expresses an activity related to people such as food, clothing, shelter and means of traveling. The identifier of the visual element is configured to uniquely identify the visual element.

Here, the visual element may be a specific visual element selected from a visual element set. Specifically, the second acquisition module 1002 may be configured to present a visual element list present triggering control in the current communication dialogue page, trigger of a visual element list to be presented when an operation over the visual element list present triggering control is detected, and after a visual element selection instruction for the visual element list is received, determine an identifier of a selected visual element as the identifier of the visual element according to the selection instruction.

The sound gathering instruction receiving module 1003 is configured to receive a sound gathering instruction.

Specifically, the sound gathering instruction receiving module 1003 may be configured to automatically trigger the sound gathering instruction after the identifier of the visual element is acquired, so that operating steps may be reduced, and convenience for operation may be improved. The sound gathering instruction receiving module 1003 may also be configured to present a sound gathering triggering control at the same time of presenting the visual element list, and when an operation over the sound gathering triggering control is detected, trigger the sound gathering instruction. The sound gathering instruction receiving module 1003 may further be configured to detect a movement trajectory of the device through a movement sensor, and when the detected movement trajectory is matched with a preset movement trajectory, trigger the sound gathering instruction. For example, the user may trigger the sound gathering instruction by shaking a mobile phone.

The sound gathering module 1004 is configured to acquire a sound to form audio data according to the sound gathering instruction.

Specifically, the sound gathering module 1004 may be configured to, after the sound gathering instruction is received, call a sound gathering device such as a microphone to acquire an environmental sound. The user may speak or produce a sound by virtue of another sound producer, and then the sound gathering device acquires a voice of the user or the other produced sound, and performs compression coding to form the audio data in a preset audio coding manner.

In an embodiment, the sound gathering module 1004 is specifically configured to start sound gathering in response to the sound gathering instruction, and stop sound gathering to obtain the audio data upon detection of a stop-gathering instruction. Specifically, sounds in an environment within a time period from a moment when the sound gathering instruction is detected to a moment when the stop-gathering instruction is detected are acquired through the sound gathering device, and form audio data by audio compression coding.

Furthermore, the user may touch a position, where the sound gathering triggering control is presented, on a touch display screen of the device to trigger the sound gathering instruction, and the user keeps pressing the sound gathering triggering control, and triggers the stop-gathering instruction when cancelling pressure on the sound gathering triggering control. Or, the user may touch once the position, where the sound gathering triggering control is presented, on the touch display screen of the device to trigger the sound gathering instruction, and touch it again to trigger the stop-gathering instruction.

In an embodiment, the sound gathering module 1004 is specifically configured to start sound gathering and timing in response to the sound gathering instruction, and stop sound gathering to obtain the audio data when a preset time length is reached by timing. In the embodiment, the user is only required to trigger the sound gathering instruction, timing is started when the sound gathering instruction is detected, and acquisition is stopped after audio data of the preset time length is acquired, so that control over the volume of the audio data is facilitated, and excessive consumption of network resources is prevented. Here, the preset time length may adopt 5 seconds to 1 minute, and is preferably 10 seconds to 25 seconds.

In an embodiment, the sound gathering module 1004 may specifically be configured to start sound gathering and timing in response to the sound gathering instruction, and stop sound gathering to obtain the audio data if the stop-gathering instruction is detected when the preset time length is not reached by timing; and stop sound gathering to obtain the audio data when the preset time length is reached by timing.

The uploading module 1005 is configured to upload the audio data to a server for storage.

Specifically, the uploading module 1005 may be configured to automatically group and upload the acquired audio data to the server 104 at the same time when the sound is acquired, so that the server 104 stores and generates a storage position identifier after receiving the complete audio data. The uploading module 1005 may also be configured to automatically upload the audio data may also be automatically uploaded to the server 104 for storage and generation of the corresponding storage position identifier after the audio data is formed.

The storage position identifier may be a complete storage address according to which the corresponding audio data on the server 104 is positioned, and may also be an identification number of the audio data. A message receiver 106 may pre-store default addresses of each piece of audio data stored in the server 104, and may position the audio data stored in the server 104 by combining the default address and the identification number of the audio data.

The storage position identifier receiving module 1006 is configured to receive a storage position identifier, fed back by the server, of the audio data.

The server 104 may feed back the corresponding storage position identifier to the message transmitter 102 which uploads the audio data, and the storage position identifier receiving module 1006 is configured to receive the storage position identifier.

The message processing module 1007 is configured to generate a message according to the identifier of the visual element and the storage position identifier, and transmit it to a message receiver corresponding to the receiving party identifier for the message receiver to present the visual element and simultaneously play the audio data.

Specifically, the message processing module 1007 may be configured to generate the message of a preset message structure by the identifier of the visual element and the storage position identifier according to the preset message structure. Here, the preset message structure may adopt a JSON format, an XML format or another self-defined message format.

In an embodiment, the message processing module 1007 may also be configured to generate the message according to the receiving party identifier, a message time, the identifier of the visual element and the storage position identifier, wherein the message time refers to a message generation time, and the message time may be configured to present the message time corresponding to the corresponding message in the message receiver 106, and may also be configured to sequence and present the received message.

The message processing module 1007 may be configured to establish a point-to-point connection with the message receiver 106 corresponding to the receiving party identifier, thereby directly transmitting the message to the message receiver 106 through the point-to-point connection. The transmitted message is configured to trigger presenting of the visual element on the message receiver 106 and simultaneous playing of the audio data downloaded from the server according to the storage position identifier.

According to the message transmitting device 1000, the user may autonomously record and upload the audio data to the server for storage at the same time of selecting the visual element. After the message generated according to the identifier of the visual element and the storage position identifier of the audio data on the server is transmitted to the message receiver, the message receiver may present the visual element and simultaneously play the audio data acquired from the server according to the storage position identifier. Therefore, the message transmitted once by the user may not only transmit information expressed by the visual element but also transmit information transmitted through the audio data, an amount of information which may be transmitted by once message transmitting is increased, and users may communicate more conveniently.

In an embodiment, the message processing module 1007 may be configured to generate the message according to the identifier of the visual element, the receiving party identifier and the storage position identifier, and transmit it to the server for the server to acquire the receiving party identifier from the message and transmit it to the corresponding message receiver.

Specifically, the message receiver 106 logs in the server 104 according to the receiving party identifier, and establishes and maintains a long connection with the server 104, so that the server 104 may directly communicate with the message receiver 106 through the long connection as desired. After the message transmitter 102 transmits the message to the server 104, the server 104 parses the receiving party identifier from the message, thereby transmitting the message to the message receiver 106 corresponding to the receiving party identifier through the long connection corresponding to the receiving party identifier.

In an embodiment, the server 104 may also detect a login state corresponding to the receiving party identifier, and if it is an unlogged-in state, caches the message, and transmits the cached message to the message receiver 106 corresponding to the receiving party identifier when the receiving party identifier corresponds to a logged-in state; and if the login state is the logged-in state, the message is directly transmitted to the message receiver 106 corresponding to the receiving party identifier.

In the embodiment, messages are transmitted with the message receiver 106 through the server 104, and message transmission efficiency and quality may be ensured.

In an embodiment, the message processing module 1007 may further be configured to, before or after generating the message according to the identifier of the visual element and the storage position identifier and transmitting it to the message receiver corresponding to the receiving party identifier, present the visual element, and simultaneously play the audio data formed by locally gathering the sound. In the embodiment, the visual element is locally automatically presented, and the corresponding audio data is played, so that the user may immediately know an effect which may be achieved by the transmitted message, and may cancel transmitting of the message as desired, and convenience in operation is improved.

Figure 11:
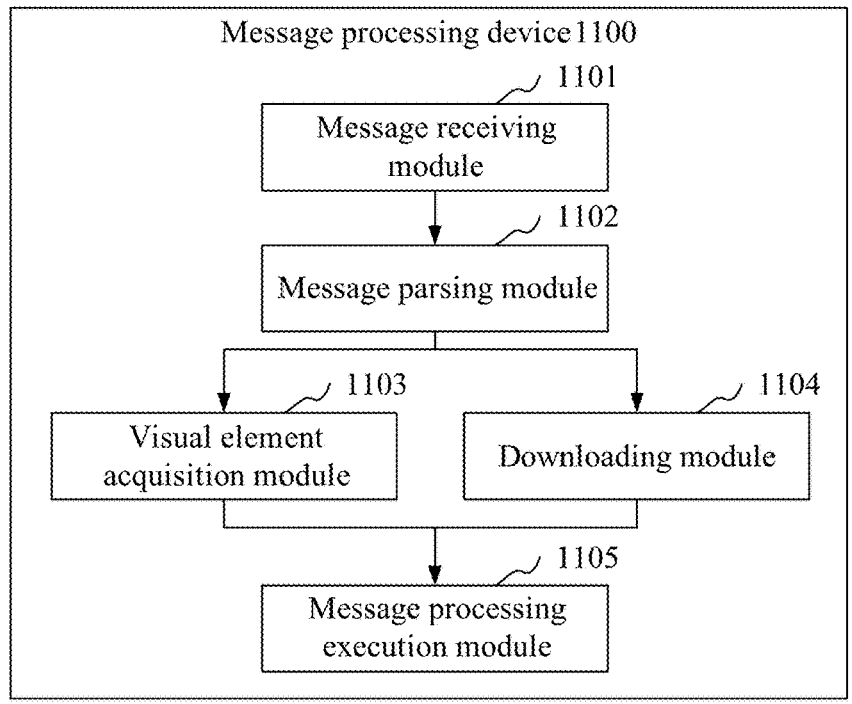
FIG. 11 is a structure block diagram of a message processing device according to an embodiment.

As shown in FIG. 11, in an embodiment, a message processing device 1100 is provided, which has a function of implementing the message processing method of each of the abovementioned embodiments. The message processing device 1100 includes: a message receiving module 1101, a message parsing module 1102, a visual element acquisition module 1103, a downloading module 1104 and a message processing execution module 1105.

The message receiving module 1101 is configured to receive a message. Specifically, the message receiving module 1101 may be configured to receive the message transmitted by a message transmitter 102 through a point-to-point connection, and may also be configured to receive the message forwarded by a server 104 according to a receiving party identifier after acquiring the receiving party identifier from the message transmitted by the message transmitter 102.

The message parsing module 1102 is configured to parse the message to obtain an identifier of a visual element and a storage position identifier of audio data stored in a server. Specifically, the message transmitter 102 may generate the message of a preset message structure by the identifier of the visual element and the storage position identifier according to the preset message structure. Correspondingly, the message parsing module 1102 may be configured to parse the message according to the preset message structure, and acquire the identifier of the visual element and the storage position identifier of the audio data stored in the server, wherein the preset message structure may adopt a JSON format, an XML format or another self-defined message format.

The visual element acquisition module 1103 is configured to acquire the visual element according to the identifier of the visual element.

Specifically, the visual element acquisition module 1103 may be configured to locally query the corresponding visual element according to the identifier of the visual element, and if not finding it, may initiate an acquisition request carrying the identifier of the visual element to the server 104 and receive the visual element which is queried and fed back by the server 104 according to the acquisition request and corresponds to the identifier of the visual element.

The downloading module 1104 is configured to download the audio data from the server according to the storage position identifier. The storage position identifier may be a complete storage address according to which the corresponding audio data on the server 104 is positioned, so that the downloading module 1104 may be configured to directly request to download the corresponding audio data from the server 104 according to the complete storage address. The storage position identification may also be an identification number of the audio data, so that the downloading module 1104 may be configured to acquire pre-stored default addresses of each piece of audio data stored in the server 104, and obtain the complete storage address of the audio by combining the default address and the identification number of the audio data, and the downloading module 1104 may be configured to request to download the corresponding audio data from the server 104 according to the complete storage address.

The message processing execution module 1105 is configured to present the visual element and simultaneously play the audio data. The visual element may be a picture or an animation file, and the message processing execution module 1105 may be configured to present the visual element in a current communication dialogue page and simultaneously decode and play the audio data through a local loudspeaker. A user may not only view the visual element transmitted by the message transmitter 102 but also hear a content of the appended audio data.

According to the message processing device 1100, the message is generated according to the identifier of the visual element and the storage position identifier of the audio data stored in the server, and in such a manner, after the message transmitted once is received, the visual element may be acquired, the corresponding audio data may be downloaded, and the audio data may be simultaneously played when the visual element is presented. Therefore, the message received once by the user may not only transmit information expressed by the visual element but also transmit information transmitted through the audio data, an amount of information which may be transmitted by once message transmitting is increased, and users may communicate more conveniently.

Figure 12:
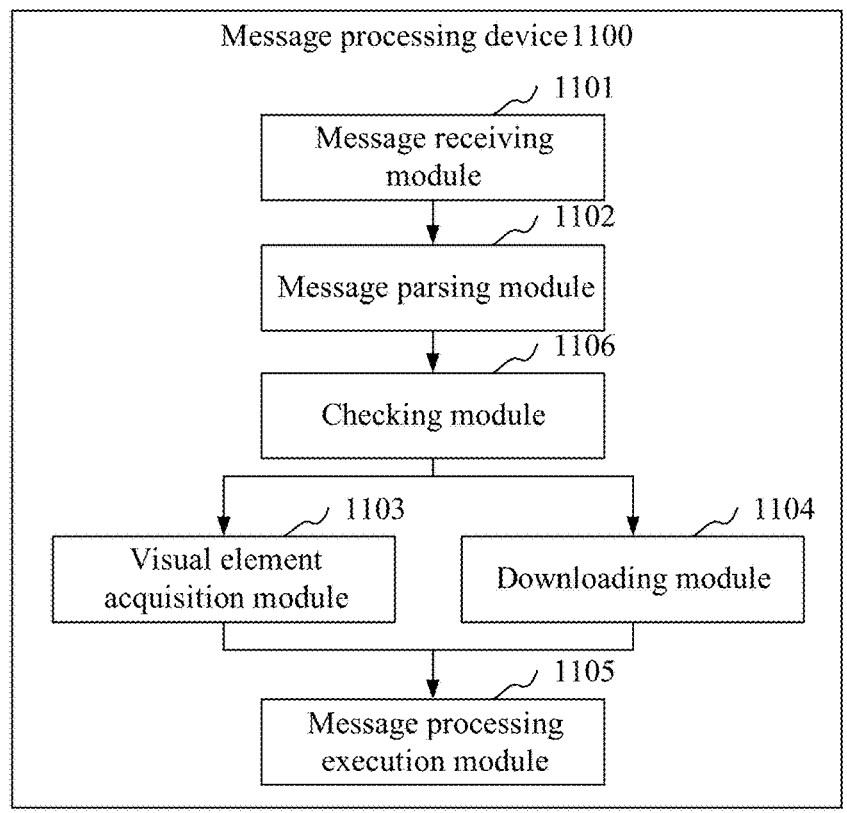
FIG. 12 is a structure block diagram of a message processing device according to another embodiment.

As shown in FIG. 12, in an embodiment, the message parsing module 1102 is also configured to parse the message to obtain the identifier of the visual element, the receiving party identifier and the storage position identifier of the audio data stored in the server. The message processing module 1100 further includes a checking module 1106, configured to judge whether the identifier of the visual element and/or the receiving party identifier meet/meets a checking condition or not for checking, the visual element acquisition module 1103 is also configured to, after checking is passed, acquire the visual element according to the identifier of the visual element, and the downloading module 1104 is also configured to, after checking succeeds, download the audio data from the server according to the storage position identifier.

Here, checking is data consistency checking, and the checking condition is a data consistency checking condition. The checking condition includes that: the identifier of the visual element exists in a supported visual element identifier set of a current application configured to present the visual element; and/or, the receiving party identifier is matched with a current login user identifier.

Here, the supported visual element identifier set refers to that the current application configured to present the visual element may support visual elements corresponding to any identifier in the visual element identifier set. The identifier of the visual element in the supported visual element identifier set indicates that the visual element may be applicable to the application. Checking whether the identifier of the visual element is within the supported visual element identifier set or not may ensure that the current application can support presenting of the visual element.

The current login user identifier refers to a user identifier used by a user for login for communication. Matching of the receiving party identifier and the current login user identifier may be complete consistency of the receiving party identifier and the user identifier, and may also be association of the receiving party identifier and the user identifier. Checking whether the receiving party identifier is matched with the current login user identifier or not may ensure that the message received by the message receiver 106 is indeed intended to be transmitted to the message receiver and avoid an error.

Figure 13:
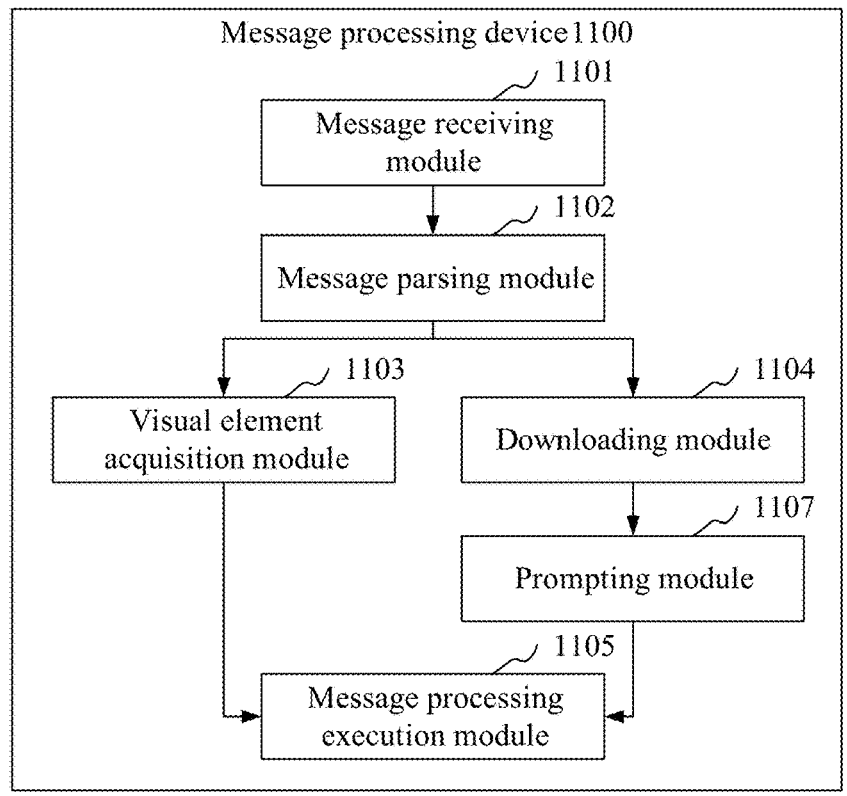
FIG. 13 is a structure block diagram of a message processing device according to another embodiment.

As shown in FIG. 13, in an embodiment, the message processing device 1100 further includes a prompting module 1107, configured to, after downloading of the audio data is completed, present an unread message prompt. The message processing execution module 1105 is further configured to, after a message reading triggering instruction for the unread message prompt is detected, present the visual element and simultaneously play the audio data.

The unread message prompt refers to a prompt indicating that there is a message which has not been locally presented yet, may be a prompt in a text form, or may be a prompt in a graphic form. Existence of the unread message is prompted to the user only after successful downloading, so that the problem of playing without sound caused by a downloading failure may be avoided.

In an embodiment, the prompting module 1107 is further configured to, after downloading of the audio data is completed, judge whether a current page is a preset message present page or not; the message processing execution module 1105 is further configured to, when the current page is the preset message present page, automatically present the visual element and simultaneously play the audio data; and the prompting module 1107 is further configured to, when the current page is not the preset message present page, present the unread message prompt at a preset position of the current page for triggering presenting of the preset message present page.

Specifically, the current page refers to a page currently presented by the message receiver 106, and if the page is the preset message present page, such as a communication dialogue page or a friend detail page, the visual element may be directly presented and the corresponding audio data may be played. If it is not the preset message present page, it is indicated that the user cannot read the message currently, and the unread message prompt may be presented at the preset position of the current page, the preset position being a position for triggering presenting of the preset message present page. Therefore, not only may the user be prompted that there is currently an unread message to avoid disturbance to the current operation of the user and simultaneously ensure that the information born by the message may be accurately transmitted, but also a portal to the preset message present page may be prompted to the user to indicate the user to enter the corresponding page to view the related content.

In an embodiment, if the preset message present page cannot be directly entered from the current page, the unread message prompt may be presented at preset positions, for triggering presenting of a subordinate page, of the current page and each page for transition to the preset message present page. The unread message prompt is preferably a prompt in the graphic form.

In an embodiment, the message processing execution module 1105 is further configured to, when the storage position identifier is not acquired by parsing the message, acquire default audio data corresponding to the identifier of the visual element, present the visual element, and simultaneously play the default audio data.

Specifically, an attribute value corresponding to a storage position identifier attribute in the message may be null, and then the storage position identifier may not be acquired by parsing the message. Acquiring no storage position identifier indicates that the message transmitter 102 does not record any audio data, and at this moment, the default audio data may be directly acquired, the visual element is presented, and the default audio data is simultaneously played.

Those skilled in the art should know that all or part of the flows in the methods of the embodiments may be implemented by related hardware instructed by a computer program, the program may be stored in a computer-readable storage medium, and when the program is executed, the flows of the embodiments of each of the abovementioned methods may be included, wherein the storage medium may be a non-volatile storage medium such as a magnetic disk, an optical disk and a Read-Only Memory (ROM), or a Random Access Memory (RAM) and the like.

Each technical feature of the abovementioned embodiments may be freely combined, and in order to simplify description, not all possible combinations of each technical characteristic in the embodiments are described. However, any combination of these technical characteristics shall fall within the scope recorded by the specification under the condition of no conflicts.

The above embodiments only describe some implementation modes of the disclosure, are specifically described in more detail, but are not thus understood as limits to the scope of patent of the disclosure. It should be pointed out that those skilled in the art may further make a plurality of transformations and improvements without departing from the concept of the disclosure, and these all fall within the scope of protection of the disclosure. Therefore, the scope of protection of the patent of the disclosure shall be subject to the appended claims.

What is claimed is:

1. A message transmitting method, performed at a terminal having one or more processors and memory, comprising: in an instant messaging application, acquiring a receiving party identifier of a receiving party, wherein the receiving party identifier is configured to identify the receiving party;

acquiring an identifier of a visual element;

acquiring audio data in response to a sound gathering operation, the audio data being combined with the visual element, in accordance with the sound; and generating a message by combining the identifier of the visual element and the audio data for a transmission of the message, wherein the message is configured to trigger a message receiver to automatically start playing the audio data the same time the visual element is first presented.

2. The method according to claim 1, further comprising:
uploading the audio data to a server for storage; and
receiving a storage position identifier of the audio data from the sever,
wherein the generating a message comprises:
generating the message in accordance with the identifier of the visual element and the storage position identifier.

3. The method according to claim 1, wherein the gathering a sound comprises:

starting sound gathering and timing in response to the sound gathering instruction, and stopping the sound gathering when the timing reaches a preset time length; or, starting sound gathering in response to the sound gathering instruction, and stopping sound gathering upon detection of a stop-gathering instruction.

4. The method according to claim 1, wherein the generating a message by combining the visual element and the audio data for a transmission of the message comprises:

generating the message in accordance with the visual element, the receiving party identifier and the audio data, and transmitting the message to a server, so as for the server to acquire the receiving party identifier from the message and transmit the message to the corresponding message receiver.

5. The method according to claim 1, wherein the visual element is a picture or an animation file.

6. The method according to claim 1, wherein acquiring the identifier of the visual element comprises:

acquiring the identifier of the visual element from a visual element list presented in a current communication dialogue page of the instant messaging application, the identifier of the visual element being configured to uniquely identify the visual element in the instant messaging application.

7. A terminal, comprising a processor and a memory in which executable instructions are stored, wherein the executable instructions, when being executed by the processor, cause the processor to execute steps of: in an instant messaging application, acquiring a receiving party identifier of a receiving party, wherein the receiving party identifier is configured to identify the receiving party;

acquiring an identifier of a visual element;

acquiring audio data in response to a sound gathering operation, the audio data being combined with the visual element, in accordance with the sound; and generating a message by combining the identifier of the visual element and the audio data for a transmission of the message, wherein the message is configured to trigger a message receiver to automatically start playing the audio data the same time the visual element is first presented.

8. The terminal according to claim 7, the executable instructions, when being executed by the processor, further cause the processor to execute steps of:
uploading the audio data to a server for storage; and
receiving a storage position identifier of the audio data from the sever;
wherein the generating a message comprises:
generating the message in accordance with the identifier of the visual element and the storage position identifier.

9. The terminal according to claim 7, wherein the gathering a sound comprises:
starting sound gathering and timing in response to the sound gathering instruction, and stopping the sound gathering when the timing reaches a preset time length, to obtain the audio data; or,
starting sound gathering in response to the sound gathering instruction, and stopping sound gathering upon detection of a stop-gathering instruction, to obtain the audio data.

10. The terminal according to claim 7, wherein the generating a message by combining the visual element and the audio data for a transmission of the message comprises:
generating the message in accordance with the visual element, the receiving party identifier and the audio data, and transmitting the message to a server, so as for the server to acquire the receiving party identifier from the message and transmit the message to the corresponding message receiver.

11. The terminal according to claim 7, wherein the visual element is a picture or an animation file.

12. The terminal according to claim 7, wherein the executable instructions, when being executed by the processor, further cause the processor to execute the following step:
presenting the visual element while playing the audio data.

13. The terminal according to claim 7, wherein the executable instructions, when being executed by the processor, further cause the processor to execute the following steps of:
receiving another message;
parsing the another message to obtain a visual element and an audio data from the another message; and
presenting the visual element while playing the audio data.

14. The terminal according to claim 13, wherein the parsing the another message to obtain a visual element and an audio data from the another message comprises:
parsing the another message to obtain an identifier of the visual element and a storage position identifier of the audio data stored in a server; and
acquiring the visual element in accordance with the identifier of the visual element, and downloading the audio data from the server in accordance with the storage position identifier.

15. The terminal according to claim 14, wherein the parsing the another message to obtain an identifier of the visual element and a storage position identifier of the audio data stored in a server comprises:
parsing the another message to obtain the identifier of the visual element, a receiving party identifier and the storage position identifier of the audio data stored in the server;

wherein after parsing the another message to obtain the identifier of the visual element and the storage position identifier of the audio data stored in the server, the method further comprises:
judging whether at least one of the identifier of the visual element and the receiving party identifier meets a checking condition or not for checking, and after checking is passed, executing the step of acquiring the visual element in accordance with the identifier of the visual element and downloading the audio data from the server in accordance with the storage position identifier;
wherein the checking condition comprises at least one of:
the identifier of the visual element being within a set of visual element identifiers supported by a current application for presenting the visual element; and,
the receiving party identifier being matched with a current login user identifier.

16. The terminal according to claim 13, wherein the executable instructions, when being executed by the processor, further cause the processor to execute the following steps:
presenting an unread message prompt, after the audio data is obtained; and
executing the step of presenting the visual element while playing the audio data, upon detection of a message-reading triggering instruction for the unread message prompt.

17. The terminal according to claim 16, wherein presenting the unread message prompt after the audio data is obtained comprises:
judging whether a current page is a preset message presenting page or not, after the audio data is obtained;
if the current page is the preset message presenting page, executing the step of presenting the visual element while playing the audio data; and
if the current page is not the preset message presenting page, presenting, in the current page, the unread message prompt at a preset position, at which entering of the preset message presenting page is triggered.

18. The terminal according to claim 13, wherein the executable instructions, when being executed by the processor, further cause the processor to execute the following steps:
if the audio data is not yet obtained by parsing the message,
acquiring default audio data corresponding to the identifier of the visual element; and
presenting the visual element while playing the default audio data.

19. A message transmission system, comprising:
a first terminal; and
a second terminal communicatively coupled to the first terminal,
wherein the first terminal is configured to: in an instant messaging application,
acquire a receiving party identifier of a receiving party, wherein the receiving party identifier is configured to identify the receiving party;
acquire an identifier of a visual element;
acquiring audio data in response to a sound gathering operation,
the audio data being combined with the visual element, in accordance with the sound;
generate a message by combining the identifier of the visual element and the audio data for a transmission of the message, wherein the message is configured to trigger a message receiver to automatically start playing the audio data the same time the visual element is first presented; and wherein the second terminal is configured to:

receive the message;

parse the message to obtain the visual element and the audio data; and automatically start playing the audio data the same time the visual element is first presented.

20. The system according to claim 19, further comprising:

a server communicatively coupled to the first terminal and the second terminal;

wherein the first terminal is further configured to upload the audio data to the server for storage, and receive a storage position identifier of the audio data from the sever, and the first terminal is configured to acquire an identifier of the visual element and generate the message in accordance with the identifier of the visual element and the storage position identifier, wherein the second terminal is configured to parse the message to obtain the identifier of the visual element and the storage position identifier of the audio data stored in the server, and acquire the visual element in accordance with the identifier of the visual element, and download the audio data from the server in accordance with the storage position identifier.

* * * * *